Figure 2:
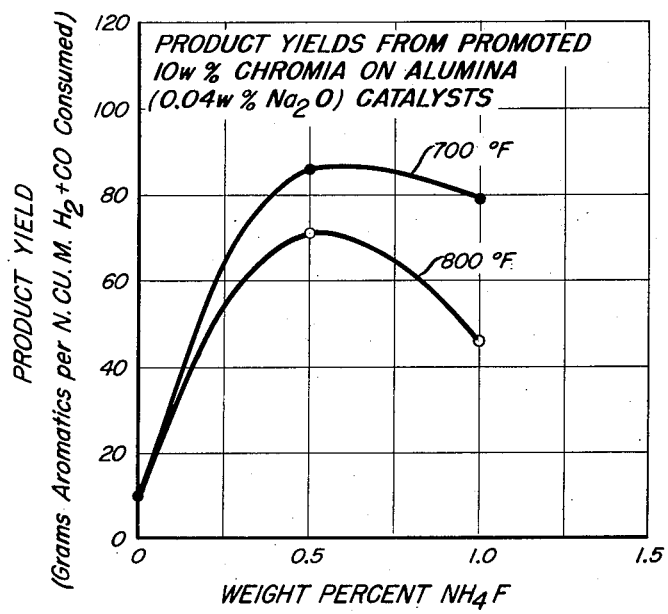

INVENTORS:
Herman I. Weck
Herman S. Seelig
BY
ATTORNEY

2,768,961

SYNTHESIS PROCESS FOR AROMATICS

Herman I. Weck, Hammond, and Herman S. Seelig, Valparaiso, Ind., assignors to Standard Oil Company, Chicago, Ill., a corporation of Indiana Application June 23, 1953, Serial No. 363,514

12 Claims. (Cl. 260—449)

This invention relates to a process for the synthesis of hydrocarbons, particularly aromatic hydrocarbons, from mixtures of carbon monoxide with hydrogen in the presence of catalysts.

In the well-known Fischer-Tropsch synthesis, iron-type or alkali-promoted thoria catalysts have been employed to produce paraffins and olefins, accompanied by very minor proportions, at most, of aromatic hydrocarbons and by variable yields of oxygenated organic compounds, depending upon the particular catalyst and synthesis conditions. The octane rating of conventional Fischer-Tropsch synthesis products is low and it has heretofore been necessary to reform the synthesis products in order to increase the octane value thereof to a suitable range for use in internal combustion engines.

It is an object of this invention to provide a catalytic synthesis process which can be operated to produce substantial yields of liquid hydrocarbons boiling substantially within the gasoline boiling range and comprising predominantly or entirely relatively low boiling liquid aromatic hydrocarbons of high octane value. Another object of this invention is to provide suitable catalysts for the production of aromatic hydrocarbons in substantial yields from mixtures of carbon monoxide and hydrogen. An additional object is to provide both catalysts and processing conditions whose employment in the reduction of carbon monoxide results in substantial yields of relatively low boiling aromatic hydrocarbons.

Essentially, the process of the present invention comprises the contacting of catalysts hereinafter defined with mixtures of hydrogen and carbon monoxide having molar ratios between about ¼ and ⅘ at temperatures between about 600° F. and about 900° F. and pressures of at least about 400 p. s. i. g. up to about 10,000 p. s. i. g. or even higher, e. g. 25,000 p. s. i. g., at space velocities (volume of gas per hour per volume of catalyst) of at least about 50 up to about 5000 (in fixed-bed reactors) or even much higher, for example up to about 20,000 (in fluidized-bed reactors). The preferred temperature range is about 750° F. to about 850° F. and the preferred pressure range is about 1000 to about 6000 p. s. i. g.

The catalysts employed in the practice of the present invention comprise essentially chromia supported upon an activated alumina (gamma alumina) containing less than about 0.3 w. percent (preferably less than 0.1 w. percent) of alkali metal (calculated as alkali metal oxide) and containing an acid-acting fluoride and/or chloride as a promoter. The proportion of acid-acting fluoride or chloride, calculated as the corresponding hydrogen halide, in the catalyst can be varied between about 0.1 and about 1 w. percent, but it is preferably present within the catalyst in proportions between about 0.1 and about 0.4 w. percent. As will appear hereinafter, the proportion of chromia in the catalyst must be closely controlled in order to secure the best yields of aromatic hydrocarbons in the synthesis. The proportion of chromia in the finished catalyst can be varied between about 1 and about 15 w. percent, and is preferably between about 3 and about 15 w. percent. In lieu of the alumina support or in partial replacement thereof, we may employ titania or vanadia.

Although chromia-alumina catalysts have heretofore been employed for the reduction of carbon monoxide to produce hydrocarbons, including aromatic hydrocarbons, the yields of aromatic hydrocarbons have been low for two reasons not appreciated by prior art investigators:

(1) Alumina, as ordinarily prepared by the precipitation of aluminum nitrate with sodium carbonate followed by repeated washings with water and drying, contains of the order of 1.5 w. percent of $Na_2O$. Although alkali metal oxides are desirable promoters for thoria and iron-type synthesis catalysts, even very small proportions of alkali metal oxide prevent the formation of aromatic hydrocarbons when present in chromia-alumina catalysts.

(2) Acid-acting fluorides and chlorides are remarkable promoters for chromia-alumina catalysts in that they induce a very large increase in the yield of aromatic hydrocarbons in the synthesis process while inducing only a relatively minor increase in the extent of carbon monoxide conversion. Moreover, as will be described in detail hereinafter, acid-acting fluorides and chlorides substantially affect the distribution of individual components in the liquid products of the synthesis reaction. As a consequence of the present invention, new sources of industrially attractive aromatic hydrocarbons become available.

The chromia-alumina catalysts having an alkali metal oxide content below about 0.3 w. percent can be prepared by known methods or combinations of known methods. A particularly desirable method of making an activated alumina containing little or no alkali metal oxide involves the preparation of an alumina sol by the reaction of aluminum amalgam with a dilute solution of an organic acid such as formic acid or acetic acid, which sol is then treated with ammonium hydroxide to precipitate a super-pure alumina gel containing little or no alkali metal oxide; this is the so-called "Indiana alumina sol technique." References to the preparation of super-pure alumina sols are given in our copending application Serial No. 325,778, filed December 13, 1952, now Patent No. 2,727,055.

In order to prepare a chromia-alumina catalyst, a soluble chromium salt such as chromium nitrate may be added to the alumina sol before precipitation. The acid-acting fluoride or chloride may also be incorporated with the chromium nitrate and the alumina sol, in proportions desirable to effectively promote the selective synthesis action of the finished catalyst. Thus a suitable catalyst may be prepared by mixing an aqueous solution containing the desired proportions of chromium nitrate or other water-soluble chromium salt, ammonium fluoride or chloride and Indiana alumina sol, precipitating oxides of chromium and aluminum containing ammonium fluoride or chloride by the addition of ammonium hydroxide solution, thereafter slowly drying the resulting gel in air at a suitable temperature (for example, about 185° F.) and finally calcining the catalyst in air, for example at a temperature of about 900° F. It will be understood that the alumina component of the catalyst may be partially or completely replaced by titania or vanadia of suitably low alkali content. Before employment of the catalysts in synthesis, they may be pretreated with hydrogen, suitable conditions being a temperature of about 900° F., hydrogen pressure of 300 p. s. i. and space velocity of 200 volumes of hydrogen per hour per volume of catalyst for about 10 hours.

The acid-acting fluorides employed to promote chromia-alumina catalysts are HF or materials capable of forming hydrogen fluoride by thermal or hydrolytic decomposition at or below the temperatures employed in the synthesis operation. Since the chromia-alumina catalysts inevitably contain water as prepared (usually about 1 to 10 w. percent water), they may be prepared with materials which are capable of reacting with water to yield hydrogen fluoride; such materials include fluorine, potassium acid fluorides, ammonium acid fluorides, $ClF_3$, $BrF_3$, $BF_3$, carbonyl fluoride, acyl fluorides and reactive alkyl fluorides, although the alkyl fluorides may be used as sources of HF via thermal decomposition. Examples of acyl fluorides include acetyl fluoride, propionyl fluoride, hexahydrobenzoyl fluoride, etc. Alkyl fluorides include ethyl fluoride, isopropyl fluoride, sec-butyl fluoride, cyclohexyl fluoride, etc. In lieu of or in addition to ammonium fluoride or ammonium acid fluorides, we may employ various volatile amine fluorides such as methylammonium fluoride, trimethylammonium fluoride, triethylammonium fluoride, etc.

Examples of suitable acid-acting chlorides and their precursors which form such chlorides by reaction with water or upon thermal decomposition include HCl, $NH_4Cl$, $Cl_2$, phosgene, acyl chlorides, various alkyl and cycloalkyl chlorides, etc.

The incorporation of acid-acting fluoride or chloride may be achieved through treatment of the refractory metal oxide catalyst support (alumina or the like) prior to the incorporation of the chromia component; by treatment of the chromia component of the catalyst; by treatment of the chromia-alumina catalyst prior to or after drying or calcining; by the introduction of acid-acting fluoride or chloride into the reactor during synthesis, for example, by the inclusion of very small proportions of certain of the acid-acting materials intermittently in proportions sufficient to activate the chromia-alumina catalyst and in the feed to affect the selectivity of the catalyst for the synthesis of aromatic hydrocarbons. The acid-acting fluoride or chloride is preferably introduced into the catalyst during its manufacture, as described above.

In order more specifically to describe and illustrate the invention, without the intent unduly to limit the same, examples are provided hereinafter. The chromia-alumina catalysts employed in the examples were prepared by coprecipitation of chromia and alumina (derived from an Indiana sol) and activated by the addition of a suitable proportion of HF, ammonium fluoride or ammonium chloride before the precipitation of the metal oxides. These catalysts were characterized by their low content of alkali metal oxide, viz. below about 0.1 w. percent. The synthesis gas contained 50 mol percent each of hydrogen and carbon monoxide. The catalyst was contained in a copper tube inserted within a vertical stainless steel reactor. In a typical equipment 130 ml. of catalyst was employed. The synthesis gas was passed downwardly through the fixed bed of catalyst, thence in sequence through three product separators operated, respectively, at 300° F., 80° F. and 32° F. A convenient and suitable space velocity was chosen in the examples, viz. about 500 volumes of gas per hour per volume of catalyst.

The following data afford a direct comparison of the effects of promoting a chromia-alumina catalyst with an acid-acting fluoride, compared with unpromoted catalysts:

TABLE 1

*Unpromoted chromia-alumina catalyst*

Catalyst: 10% $Cr_2O_3$ on $Al_2O_3$.
Run Conditions: 450 p. s. i. g., 500 Vg/Vc/Hr. using 1/1 $H_2$/CO synthesis gas as feed.

| Run Period | A | B | C | D | E |
|---|---|---|---|---|---|
| Hours | 24 | 24 | 24 | 24 | 120 |
| Temp., °F | 700 | 800 | 900 | 975 | 975 |
| Percent Contraction [1] | 6.4 | 8.8 | 12.0 | 15.6 | 18.4 |
| Percent CO Conversion [2] | 9.0 | 13.0 | 20.3 | 26.0 | 22.5 |
| Product Yields [1] (grams/normal cubic meter of $H_2$ and CO consumed): | | | | | |
| $C_3^+$ | 11 | 54 | 46 | 78 | 82 |
| Aromatics | 11 | 10 | 10 | 10 | 17 |
| R. I. of Liquid Oil | 1.504 | 1.504 | 1.504 | 1.504 | 1.515 |
| Percent Carbon Converted to: [2] | | | | | |
| $CO_2$ | 58.6 | 53.5 | 50.0 | 41.8 | 50.6 |
| $C_1$–$C_2$ | 38.0 | 25.6 | 35.3 | 33.7 | 8.8 |
| $C_3^+$ | 3.4 | 20.9 | 14.7 | 24.5 | 40.6 |
| Total | 100.0 | 100.0 | 100.0 | 100.0 | 100.0 |
| Aromatics Yield: | | | | | |
| Percent of CO Converted | 3.4 | 3.87 | 3.19 | 3.14 | 8.4 |
| Percent of CO Charged | 0.31 | 0.50 | 0.65 | 0.82 | 1.89 |

[1] Based on observed weight balance.
[2] Based on a 100% carbon balance on an output basis.

TABLE 2

Catalyst: 10% $Cr_2O_3$ + 0.5% $NH_4F$ on $Al_2O_3$.
Run Conditions: 450 p. s. i. g., 500 Vg/Vc/Hr. using 1/1 $H_2$/CO synthesis gas as feed.

| Run Period | A | B | C | D | E | F |
|---|---|---|---|---|---|---|
| Hours | 120 | 120 | 120 | 120 | 120 | 120 |
| Temp., °F | 700 | 750 | 800 | 850 | 900 | 975 |
| Percent Contraction [1] | 6.1 | 4.4 | 8.9 | 10.8 | 12.4 | 14.9 |
| Percent CO Conversion [2] | 5.8 | 11.7 | 13.0 | 13.7 | 21.2 | 22.2 |
| Product Yields [1] (grams/normal cubic meter of $H_2$+CO consumed): | | | | | | |
| $C_3^+$ | 60 | 81 | 159 | 81 | 82 | 32 |
| Aromatics | 57 | 77 | 64 | 47 | 17 | 2.3 |
| R. I. of Liquid Oil | 1.535 | 1.524 | 1.518 | 1.513 | 1.513 | 1.520 |
| Percent Carbon Converted to: [2] | | | | | | |
| $CO_2$ | 68.2 | 54.2 | 47.9 | 62.3 | 38.5 | 42.6 |
| $C_1$–$C_2$ | 4.5 | 26.9 | 1.8 | 12.4 | 35.7 | 45.4 |
| $C_3^+$ | 27.3 | 18.9 | 50.3 | 25.3 | 25.8 | 12.0 |
| Total | 100.0 | 100.0 | 100.0 | 100.0 | 100.0 | 100.0 |
| Aromatics Yield: | | | | | | |
| Percent of CO Converted | 26.0 | 17.9 | 20.3 | 14.7 | 5.4 | .86 |
| Percent of CO Charged | 1.51 | 2.1 | 2.64 | 2.01 | 1.14 | .19 |

[1] Based on observed weight balance.
[2] Based on a 100% carbon balance on an output basis.

From Table 1 it will be noted that the maximum ultimate yield of aromatics which could be obtained from the unpromoted catalyst is only about 17 grams per normal cubic meter (n. c. m.) of synthesis gas and that the best results were obtained at 975° F.

The theoretical ultimate yield of aromatics in the synthesis is of the order of 300 grams per normal cubic meter of synthesis gas containing 50 mol percent each of carbon monoxide and hydrogen.

From Table 2 it will be apparent that the promoted catalyst was far more active at lower temperatures, 975° F. being far too high, and that at lower temperatures within the range of 700–900° F., the yields of aromatic hydrocarbons ranged from 17 to 77 grams per n. c. m. of synthesis gas.

The data of Table 3 show the promotion of chromia-alumina catalysts with an acid-acting fluoride markedly affects the distribution of aromatic hydrocarbons in the liquid product, tending to increase the average molecular weight of the aromatics derived from the synthesis. Comparisons are made of the product distribution of aromatic hydrocarbons derived from a very low alkali alumina catalyst (0.04 w. percent $Na_2O$), unpromoted chromia-alumina (0.02–0.04 w. percent $Na_2O$) and promoted chromia-alumina (0.02–0.04 w. percent $Na_2O$).

TABLE 3

*Hydrocarbon distribution*

(Volume percent of aromatics)

| Carbon No. | Catalyst— $Al_2O_3$ | 10% $Cr_2O_3$ on $Al_2O_3$ | 10% $Cr_2O_3$+ 0.6% $NH_4F$ on $Al_2O_3$ |
|---|---|---|---|
| 6 | 1.1 | | 1.1 |
| 7 | 1.8 | 1.5 | 0.5 |
| 8 | 8.1 | 9.5 | 3.1 |
| 9 | 18.7 | 32.0 | 7.2 |
| 10 | 42.0 | 29.5 | 27.2 |
| 11 | 11.0 | 15.0 | 20.2 |
| 11+ | 17.3 | 12.5 | 40.7 |
| Total | 100.0 | 100.0 | 100.0 |

Analyses by infrared techniques of the aromatic hydrocarbon fractions described in Table 3 showed that the following aromatic hydrocarbons are present:

TABLE 4

*Identification of aromatic hydrocarbons*

| Carbon No. | Hydrocarbons |
|---|---|
| 6 | Benzene. |
| 7 | Toluene. |
| 8 | m- and p-Xylene, traces o-xylene. |
| 9 | 1-methyl-3-ethylbenzene, 1-methyl-4-ethylbenzene, 1,2,4-trimethylbenzene, trace mesitylene. |
| 10 | 1,3-dimethyl-5-ethylbenzene, 1,4-dimethyl-2-ethylbenzene, 1,3-dimethyl-2-ethylbenzene, durene, isodurene, 1,2,3,4-tetramethylbenzene. |
| 11 | Pentamethylbenzene. |
| 11+ | 2-methylnaphthalene, hexamethylbenzene, other unidentified aromatics. |

From Table 4 it will be noted that almost all the liquid product consists of benzene and benzene derivatives, almost all the substituent groups are methyl groups, and that practically all of the isomers are present.

The effect of increasing the reaction pressure from 450 p. s. i. g. to 900 p. s. i. g. (cf Table 2), is indicated in Tables 5 and 6. Table 5 affords direct comparisons with Table 2 but in obtaining the data of Table 6 the concentration of ammonium fluoride promoter was reduced from 0.5 w. percent to 0.25 w. percent.

TABLE 5

Catalyst: 10% $Cr_2O_3$+0.5% $NH_4F$ on $Al_2O_3$.
Run Conditions: 900 p. s. i., 500 s. v., 1/1 $H_2$/CO.

| Run Period | A | B | C[1] | D | E | F |
|---|---|---|---|---|---|---|
| Hours | 72 | 72 | 72 | 72 | 72 | 72 |
| Temp., °F | 650 | 700 | 700 | 600 | 750 | 800 |
| Percent contraction [2] | 15.4 | 19.8 | 21.7 | 6.5 | 24.1 | 24.6 |
| Percent CO conversion [3] | 31.4 | 36.5 | 40.9 | 11.7 | 36.3 | 39.4 |
| Product Yields [2] (grams/n.c.m. of $H_2$+CO consumed): | | | | | | |
| $C_3$+ | 87 | 73 | 102 | 99 | 31 | 16 |
| Aromatics | 83 | 38 | 61 | 96 | 6 | 1 |
| R. I. of Liquid Oil | 1.512 | 1.499 | 1.502 | 1.525 | 1.526 | 1.516 |
| Percent Carbon Converted to:[3] | | | | | | |
| $CO_2$ | 47.8 | 45.3 | 49.1 | 48.7 | 44.0 | 42.3 |
| $C_1$-$C_2$ | 28.6 | 33.4 | 21.8 | 22.7 | 44.8 | 52.2 |
| $C_3$+ | 23.6 | 21.3 | 29.1 | 28.6 | 11.2 | 5.5 |
| | 100.0 | 100.0 | 100.0 | 100.0 | 100.0 | 100.0 |
| Aromatic Yield: | | | | | | |
| Percent of CO converted | 22.5 | 11.1 | 17.4 | 27.7 | 2.2 | 0.3 |
| Percent of CO charged | 7.1 | 4.1 | 7.1 | 3.2 | 0.8 | 0.1 |

[1] Run at 212 space velocity.
[2] Based on observed weight balance.
[3] Based on a 100% carbon balance on an output basis.

Comparing Table 5 with Table 2, it is observed that the aromatics yields, based on percentage carbon monoxide charged, are very substantially increased at the lower operating temperatures (600–700°F.) at the 900 p. s. i. operating pressure. In other words, with increasing reaction pressure, lower reaction temperatures may be employed to obtain highly desirable aromatic yields.

Periods B and C of Table 5 constitute a space velocity study. It will be noted that halving the spaced velocity resulted in a large increase in the yield of aromatic hydrocarbons under otherwise constant operating conditions.

TABLE 6

Catalyst: 10% $Cr_2O_3$+0.25% $NH_4F$ on $Al_2O_3$.
Run Conditions: 900 p. s. i., 500 s. v., 1/1 $H_2$/CO.

| Run Period | A | B | C | D |
|---|---|---|---|---|
| Hours | 72 | 68 | 48 | 48 |
| Temp., °F | 700 | 650 | 750 | 800 |
| Percent Contraction [1] | 13.8 | 6.9 | 13.9 | 18.4 |
| Percent CO conversion [2] | 24.9 | 11.2 | 31.3 | 33.3 |
| Product Yields [1] (grams/n. c. m. of $H_2$+CO consumed): | | | | |
| $C_3$+ | 85 | 103 | 46 | 16 |
| Aromatics | 82 | 99 | 44 | 16 |
| R. I. of Liquid Oil | 1.522 | 1.535 | 1.508 | 1.503 |
| Percent Carbon converted to: [2] | | | | |
| $CO_2$ | 50.4 | 49.6 | 50.2 | 51.4 |
| $C_1$-$C_2$ | 24.4 | 19.2 | 37.1 | 43.0 |
| $C_3$+ | 25.2 | 31.2 | 12.7 | 5.6 |
| | 100.0 | 100.0 | 100.0 | 100.0 |
| Aromatic Yield: | | | | |
| Percent of CO converted | 24.3 | 30.0 | 12.2 | 5.6 |
| Percent of CO charged | 6.1 | 3.4 | 3.8 | 1.9 |

[1] Based on observed weight balance.
[2] Based on a 100% carbon balance on an output basis.

The data in Table 6 show that suitable conversions of carbon monoxide and desirable yields of aromatics (grams per normal cubic meter of hydrogen and carbon monoxide consumed) can be obtained at the high pressure with relatively low ammonium fluoride promoter concentration.

In the following table are presented data obtained with a charging stock having a 2:1 $H_2$:CO volume ratio. From the data it will be noted that substantial conversions of carbon monoxide were obtained and that in general the carbon monoxide conversion was substantially greater than that obtained under comparable operating conditions with a comparable catalyst using a feed of equal volumes of hydrogen and carbon monoxide (cf. Table 2). It will also be noted from Table 7 that the refractive index of the liquid oil indicates that it is substantially completely aromatic. However, the ultimate yield of aromatic hydrocarbons appears to be somewhat greater with the 1:1 feed as compared with the 2:1 $H_2$:CO feed.

TABLE 7

Catalyst: 11% $Cr_2O_3$+0.6% $NH_4F$ on $Al_2O_3$.
Run Conditions: 450 p. s. i., 500 s. v., 2/1 $H_2$/CO.

| Run Period | A | B | C | D | E | F |
|---|---|---|---|---|---|---|
| Hours | 120 | 120 | 120 | 120 | 120 | 120 |
| Temp., °F | 700 | 750 | 800 | 850 | 900 | 975 |
| Percent Contraction [1] | 7.4 | 7.3 | 11.7 | 14.1 | 19.4 | 16.6 |
| Percent CO conversion [2] | 3.5 | 20.9 | 27.6 | 29.8 | 36.1 | 28.4 |
| Product Yields [1] (grams/n. c. m. of $H_2$+CO consumed): | | | | | | |
| $C_3$+ | 59 | 155 | 79 | 43 | 19 | 16 |
| Aromatics | 59 | 39 | 14 | 4 | <1 | <1 |
| R. I. of Liquid Oil | 1.533 | 1.522 | 1.516 | 1.512 | | |
| Percent Carbon converted to:[2] | | | | | | |
| $CO_2$ | 35.6 | 43.2 | 40.7 | 42.9 | 38.2 | 40.6 |
| $C_1$-$C_2$ | 6.6 | 19.7 | 34.4 | 41.8 | 53.1 | 52.5 |
| $C_3$+ | 57.8 | 37.1 | 24.9 | 15.3 | 8.7 | 6.9 |
| | 100.0 | 100.0 | 100.0 | 100.0 | 100.0 | 100.0 |
| Aromatic Yield: | | | | | | |
| Percent of CO converted | | 9.3 | 4.4 | 1.4 | | |
| Percent of CO charged | 2.0 | 1.9 | 1.2 | 0.4 | | |

[1] Based on observed weight balance.
[2] Based on a 100% carbon balance on an output basis.

A further comparison at 450 p. s. i. of unpromoted chromia-alumina catalysts with promoted catalysts is afforded by the following figures. From Figure 1 it will be noted that within the temperature range of 700° to 900°F., promotion of the catalyst with acid-acting fluoride resulted in substantial increases in yields of aromatic hydrocarbons.

Figure 1:
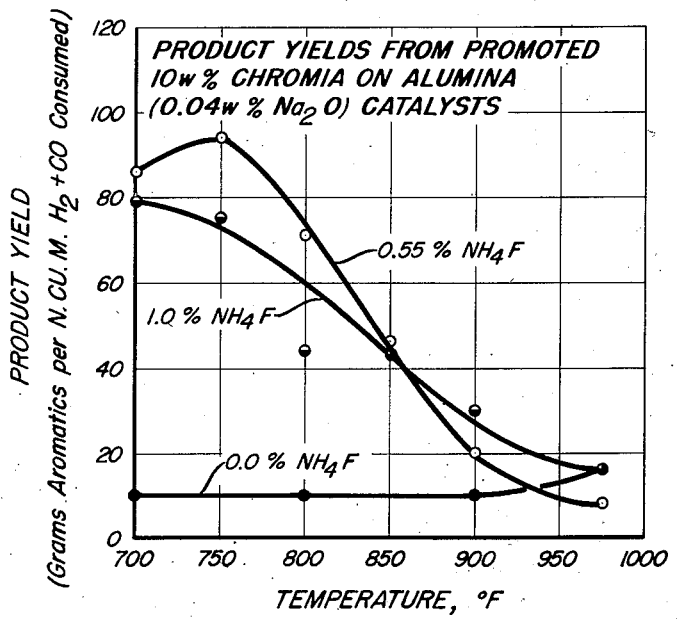

Figure 2 is a cross-plot of two isotherms from Figure 1 against which are related aromatics yield and weight percent ammonium fluoride in the catalyst. From the data of Figure 2 it will be noted that an apparent optimum ammonium fluoride concentration was about 0.5 w. percent, which is equivalent to about 0.25 w. percent of HF in the catalyst.

Figure 3:
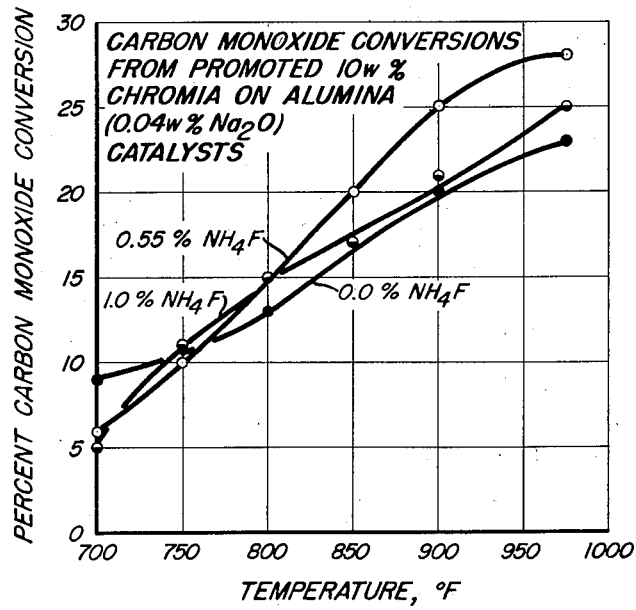

In Figure 3 are presented data on the extent of carbon monoxide conversion as a function of temperature for the three catalysts whose other characteristics were set forth in Figures 1 and 2.

Figure 4:
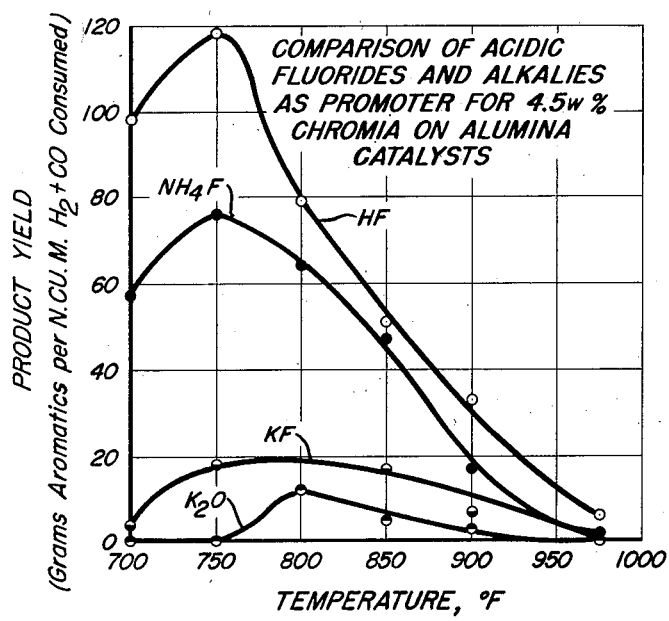

In Figure 4 are presented data on the aromatics-production capacity of 4.5 w. percent chromia-alumina catalysts promoted with 0.2 w. percent fluoride ion combined with different cations and a comparison is also made of the unpromoted chromia-alumina catalyst containing 0.6 w. percent $K_2O$. Figure 4 indicates that an acid-acting fluoride is required to promote the chromia-alumina catalysts, since KF exerts only a relatively minor promoting effect (note Figure 1 wherein one of the catalysts contained no fluoride promoter). The data on the effects of $K_2O$ in the catalyst are clearly discernible from Figure 4; over most of the temperature range, $K_2O$ substantially repressed the production of aromatic hydrocarbons by the catalyst.

Figure 5:
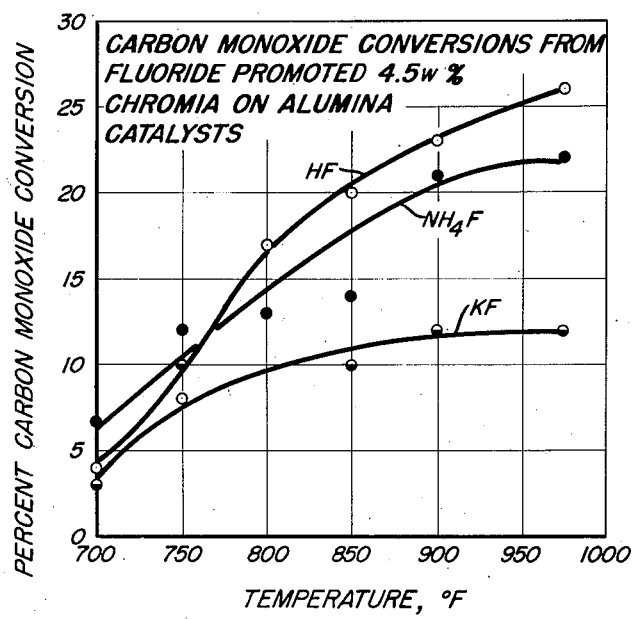

From Figure 5 it will be apparent that the extent of carbon monoxide conversion was greatest with HF-promoted catalyst, somewhat lower with ammonium fluoride-promoted catalyst and least with KF-promoted catalyst at temperatures above about 750° F.

Figure 6:
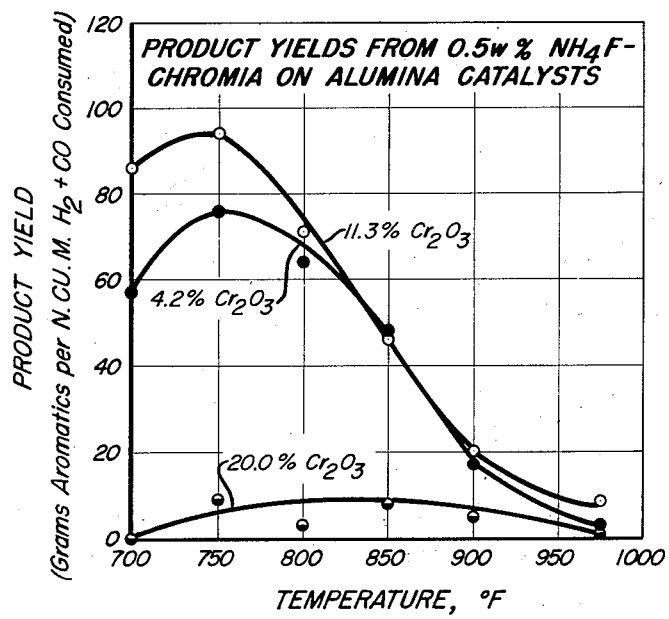

In Figure 6 are presented data illustrating the effect of the chromia content of promoted chromia-alumina catalysts on the aromatics productivity of these catalysts. From the data in Figure 6 it appears that a chromia content of about 10 w. percent is optimum and that severe losses in the ultimate yields of aromatic hydrocarbons are incurred by going to catalysts containing 20% chromia.

In Table 8 are presented data obtained with $NH_4Cl$-promoted chromia-alumina catalyst. The data of Table 8 may be compared with those of Table 2 wherein ammonium fluoride was employed as the promoter under otherwise constant operating conditions and catalyst composition. It will be noted from Table 8 that ammonium chloride was a very desirable promoter, although the chloride was somewhat less effective than the fluoride. The most successful operating periods of Table 8 were A, B and C, covering the range of 700° to 800° F.

TABLE 8

Catalyst: 10% $Cr_2O_3$+0.5% $NH_4Cl$ on $Al_2O_3$.
Run Conditions: 450 p. s. i., 500 s. v., 1/1 $H_2/CO$.

| Run Period | A | B | C | D | E | F |
|---|---|---|---|---|---|---|
| Hours | 72 | 72 | 72 | 72 | 72 | 72 |
| Temp., °F | 700 | 750 | 800 | 800 | 900 | 975 |
| Percent Contraction [1] | 5.1 | 5.9 | 9.9 | 13.8 | 14.2 | 16.6 |
| Percent CO conversion [2] | 5.8 | 9.9 | 15.0 | 17.2 | 20.8 | 23.7 |
| Product Yields[1] (grams/n. c. m. of $H_2$+CO consumed): | | | | | | |
| $C_3$+ | 40 | 70 | 60 | 17 | 19 | 4 |
| Aromatics | 38 | 67 | 57 | 16 | 18 | 3 |
| R. I. of Liquid Oil | 1.538 | 1.529 | 1.518 | 1.511 | 1.508 | 1.519 |
| Percent Carbon converted to:[2] | | | | | | |
| $CO_2$ | 62.5 | 50.0 | 47.6 | 52.7 | 46.0 | 41.6 |
| $C_1$-$C_2$ | 21.4 | 30.2 | 34.5 | 40.6 | 47.0 | 57.6 |
| $C_3$+ | 16.1 | 19.8 | 17.9 | 6.7 | 7.0 | 0.8 |
| | 100.0 | 100.0 | 100.0 | 100.0 | 100.0 | 100.0 |
| Aromatic Yield: | | | | | | |
| Percent of CO converted | 15.3 | 19.0 | 17.0 | 6.3 | 6.6 | 0.6 |
| Percent of CO charged | 0.9 | 1.8 | 2.6 | 1.1 | 1.4 | 0.2 |

[1] Based on observed weight balance.
[2] Based on a 100% carbon balance on an output basis.

The proper selection and activation of catalysts for the purpose of aromatics production from carbon monoxide and hydrogen is at present a purely empirical procedure, since no method of predicting the suitability of catalysts or promoters for the stated purpose is now known. Apparently similar catalysts, from the standpoint of chemical constitution, show widely different capacities for producing aromatic hydrocarbons in the synthesis reaction, as will be evident from the data of Table 9 below:

TABLE 9

*Examples of other catalysts tested for the synthesis of aromatics*

| Catalyst | Percent CO Conversion | Aromatic Yield, g./n. cu. m. |
|---|---|---|
| $ThO_2$+0.1% $K_2CO_3$ ($K_2CO_3$ precipitated) | 21 | 11 |
| 9% $TiO_2$ on $Al_2O_3$ | 7 | 11 |
| 8% $ZrO_2$ on $Al_2O_3$ | 13 | 7 |
| $ThO_2$+5.0% $K_2CO_3$ ($K_2CO_3$ precipitated) | 26 | 5 |
| ZnO | 25 | 3 |
| 10% $WO_3$ on $Al_2O_3$ | 17 | 2 |
| 10% $Co_2O_3$ on $Al_2O_3$ | 15 | 1 |
| 10% $ThO_2$+1% $K_2CO_3$ on $Al_2O_3$ | 10 | Trace |
| 5% $MoS_3$ on $Al_2O_3$ | 63 | None |
| 8% $MoO_3$ on $Al_2O_3$ | 50 | None |
| 0.6% Pt on $Al_2O_3$ | 48 | None |
| $V_2O_5$ | 48 | None |
| 1.0% $ZrS_2$ on $ZrO_2$ | 40 | None |
| 10% $WO_3$ on $ZrO_2$ | 40 | None |
| 10% $MoO_3$+1.0% $NH_4F$ on $Al_2O_3$ | 22 | None |
| 9% $Ag_2O$ on $Al_2O_3$ | 16 | None |
| 10% $Ni_2O_3$+0.5% $NH_4F$ on $Al_2O_3$ | 11 | None |
| 9% $SnO_2$+0.5% $NH_4F$ on $Al_2O_3$ | 14 | None |
| 8% $MnO_2$ on $Al_2O_3$ | 9 | None |
| 9% $SnO_2$ on $Al_2O_3$ | 9 | None |
| 9% $B_2O_3$ on $Al_2O_3$ | 2 | None |
| 90% $SiO_2$10% $Al_2O_3$ | 0 | None |

The above results represent the best yields which could be obtained in operations at 500 space velocity, equimolar proportions of hydrogen and carbon monoxide in the feed, a fixed bed of catalyst, 450 p. s. i. reaction pressure, and temperatures within the range of 700° to 975° F. All the aluminas in Table 9 contained less than 0.1 w.% alkali metal oxide.

It will be understood that conventional methods of synthesis catalyst regeneration can be employed to reactivate partially spent chloride- or fluoride-promoted chromia-alumina catalysts, e. g. treatment of partially spent catalyst with oxygen-containing gases to burn off carbonaceous deposits. Likewise, conventional synthesis reactors of either the fixed-bed or fluidized-bed type may be employed in practicing the process of the present invention. It will be understood that unconverted gases may be recycled to the reactor or passed to a secondary reactor containing the promoted catalyst.

The aromatic hydrocarbon products of the present invention are practically uncontaminated with paraffins or olefins. The fractions may be employed alone or as blending components in motor gasoline or aviation fuels. The aromatic product mixtures produced by the process of this invention can be subjected to known separation procedures to produce concentrates of individual aromatic hydrocarbons or mixtures of isomers, which may be of value for the purpose of producing chemical derivatives.

Having thus described our invention, we claim:

1. A process for the preparation of hydrocarbons, including a substantial proportion of aromatic hydrocarbons, which process comprises contacting a mixture of hydrogen and carbon monoxide in a volume ratio between about 1:4 to 4:1 with a catalyst comprising essentially about 1 to about 15 weight percent chromium oxide supported upon a gamma alumina, between about 0.1 and about 1 weight percent of an acid-acting halide selected from the group consisting of fluorides and chlorides, calulated as the hydrogen halide, and not more than about 0.3 weight percent of alkali metal, calculated as oxide, effecting said contacting at a temperature between about 600° F. and about 900° F. at a pressure of at least about 400 p. s. i. g., and separating synthesis products including a substantial proportion of aromatic hydrocarbons.

2. The process of claim 1 wherein the volume ratio of hydrogen to carbon monoxide is about 1.

3. The process of claim 1 wherein the temperature is between about 600° F. and about 850° F.

4. A process for the preparation of hydrocarbons, including a substantial proportion of aromatic hydrocarbons, which process comprises contacting a mixture of hydrogen and carbon monoxide in a volume ratio between about 1:4 to 4:1 with a catalyst comprising essentially about 1 to about 15 weight percent chromium oxide supported upon a gamma alumina, between about 0.1 and about 1 weight percent of an acid-acting fluoride, calculated as HF, and not more than about 0.3 weight percent of alkali metal, calculated as oxide, effecting said contacting at a temperature between about 600° F. and about 900° F. at a pressure of at least about 400 p. s. i. g., and separating synthesis products including a substantial proportion of aromatic hydrocarbons.

5. A process for the preparation of hydrocarbons, including a substantial proportion of aromatic hydrocarbons, which process comprises contacting a mixture of hydrogen and carbon monoxide in a volume ratio between about 1:4 to 4:1 with a catalyst comprising essentially about 1 to about 15 weight percent chromium oxide supported upon a gamma alumina, between about 0.1 and about 1 weight percent of an acid-acting chloride, calculated as HCl, and not more than about 0.3 weight percent of alkali metal, calculated as oxide, effecting said contacting at a temperature between about 600° F. and about 900° F. at a pressure of at least about 400 p. s. i. g., and separating synthesis products including a substantial proportion of aromatic hydrocarbons.

6. A process for the preparation of hydrocarbons, including a substantial proportion of aromatic hydrocarbons, which process comprises contacting a mixture of hydrogen and carbon monoxide in a volume ratio between about 1:4 to 4:1 with a catalyst consisting essentially of about 10 weight percent chromia supported upon activated alumina, said catalyst containing between about 0.1 and about 0.4 weight percent of an acid-acting fluoride, calculated as HF, said catalyst containing not more than about 0.1 weight percent of an alkali metal, calculated as oxide, said contacting being effected at a temperature between about 600° F. and about 850° F. at a pressure of at least about 400 p. s. i. g.

7. The process of claim 6 wherein said acid-acting fluoride is hydrogen fluoride.

8. The process of claim 6 wherein said acid-acting fluoride is ammonium fluoride.

9. A process for the preparation of hydrocarbons, including a substantial proportion of aromatic hydrocarbons, which process comprises contacting a mixture of hydrogen and carbon monoxide in a volume ratio between about 1:4 to 4:1 with a catalyst consisting essentially of about 10 weight percent chromia supported upon activated alumina, said catalyst containing between about 0.1 and about 0.4 weight percent of an acid-acting chloride, calculated as HCl, said catalyst containing not more than about 0.1 weight percent of an alkali metal, calculated as oxide, said contacting being effected at a temperature between about 600° F. and about 850° F. at a pressure of at least about 400 p. s. i. g.

10. The process of claim 9 wherein said acid-acting chloride is hydrogen chloride.

11. The process of claim 9 wherein said acid-acting chloride is ammonium chloride.

12. A process for the preparation of hydrocarbons, including a substantial proportion of aromatic hydrocarbons, which process comprises contacting a mixture of hydrogen and carbon monoxide in a volume ratio between about 1:4 to 4:1 with a catalyst comprising essentially about 1 to about 15 weight percent chromium oxide supported upon a gamma alumina, between about 0.1 and about 1 weight percent of an acid-acting halide selected from the group consisting of fluorides and chlorides, calculated as the hydrogen halide, and not more than about 0.1 weight percent of alkali metal, caluculated as oxide, effecting said contacting at a temperature between about 600° F. and about 900° F. at a pressure of at least about 400 p. s. i. g., and separating synthesis products including a substantial proportion of aromatic hydrocarbons.

References Cited in the file of this patent

UNITED STATES PATENTS

| | | |
|---|---|---|
| 2,194,186 | Pier et al. | Mar. 19, 1940 |
| 2,422,372 | Smith et al. | June 17, 1947 |
| 2,500,146 | Fleck et al. | Mar. 14, 1950 |

OTHER REFERENCES

Haensel: Office of Technical Services Report No. PB 284," pp. 6 to 9 (Jan. 11, 1946), Dept. of Commerce, Washington, D. C.

Storch et al.: "The Fischer-Tropsch and Related Synthesis," John Wiley & Sons, Inc., New York (1951), pages 7, 225 and 458.